(12) United States Patent
O'Riordain

(10) Patent No.: US 6,434,364 B1
(45) Date of Patent: Aug. 13, 2002

(54) WIRELESS COMMUNICATION SYSTEM THAT SUPPORTS MOBILE TEST SOFTWARE AGENTS

(75) Inventor: Fergal O'Riordain, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/220,456

(22) Filed: Dec. 24, 1998

(51) Int. Cl.⁷ ............................................... H04B 17/00
(52) U.S. Cl. ...................... 455/67.1; 455/67.3; 455/419
(58) Field of Search ................................ 455/419, 422, 455/423, 425, 432, 436, 437, 456, 458, 466, 464, 509, 513, 67.1, 67.3

(56) References Cited

U.S. PATENT DOCUMENTS

| | | | |
|---|---|---|---|
| 5,357,557 A | | 10/1994 | Yukinori |
| 6,018,645 A | * | 1/2000 | Spatz et al. .................... 455/88 |
| 6,023,620 A | * | 2/2000 | Hansson ...................... 455/419 |
| 6,088,588 A | * | 7/2000 | Osborne |
| 6,347,217 B1 | * | 2/2002 | Bengtsson et al. |

FOREIGN PATENT DOCUMENTS

| | | |
|---|---|---|
| WO | WO97/33446 | 9/1997 |
| WO | WO98/38820 | 9/1998 |

* cited by examiner

Primary Examiner—Curtis Kuntz
Assistant Examiner—Barry W Taylor
(74) Attorney, Agent, or Firm—Burns, Doane, Swecker & Mathis, L.L.P.

(57) ABSTRACT

A communication system supports Mobile Test Software Agents (MTSAs) that are software modules, executable at mobile stations for placing them in a test mode. The mobile stations are placed in the test mode by executing a downloaded MTSA at a specified test location, based on location information contained within location registers of the communication system. In the test mode, each mobile station is configured, according to parameters defined by a MTSA, to allow for system performance measurements. Each MTSA represents an active, addressable computer program that can observe and initiate activities in its environment, can communicate with other agents and can be transported across data networks that are configured to take performance measurement.

25 Claims, 5 Drawing Sheets

WIRELESS COMMUNICATION SYSTEM THAT SUPPORTS MOBILE TEST SOFTWARE AGENTS

TECHNICAL FIELD OF THE INVENTION

This invention relates to wireless communication systems in general, more particularly, to improving system performance based on information derived from remotely operating mobile stations.

BACKGROUND

Wireless Communication systems, in general, and cellular systems, in particular, are extensively used to provide communication services to a wide array of mobile subscribers. For example, European Telecommunication Standard Institute (ETSI) has specified a Global Standard for Mobile Communication (GSM) that uses time division multiple access (TDMA) to communicate control, voice and text information over radio frequency (RF) channels. In the U.S., Telecommunication Industry Association (TIA) has published a number of Interim Standards, such as IS-136, that define various versions of digital advanced mobile phone service (D-AMPS), with the capability of transmitting voice and data to subscribers. Generally, these systems include scattered base stations that communicate via corresponding transceivers with mobile stations over uplink and down link RF channels. During normal operation, the base stations transmit communication signals to the mobile stations over downlink RF channels and receive communication signals from the mobile stations over uplink RF channels. Similarly, the mobile stations include transceivers that transmit communication signals over the uplink RF channels and receive communication signals over the downlink RF channels.

Over the years, communication system operators have recognized that quality of communication over RF channels is of utmost importance. The communication quality over the RF channels is affected by the condition of various radio elements, i.e., the antenna equipment and transceivers, of the base station. Therefore, system operators regularly monitor the operating condition of their systems, in order to offer their services with a satisfactory quality level. The regular monitoring of operating condition, which involves performing a battery of tests and measurements, is costly. As a result, the systems operators are constantly searching for ways to reduce their operating cost, without sacrificing the quality of the offered services.

Conventionally, test equipments, which are capable of establishing wireless communication with the base station for emulating communication path with mobile stations, are used to perform the test and measurements. Under one arrangement, a technician visits cell sites in order to perform manual measurements using the test equipment. The labor cost of performing the tests manually, however, is high, with such cost increasing as the size of a system and/or the number of its cell sites become larger. Therefore, less costly automated test and measurements methods are preferred, because they eliminate the need for visiting the cell sites, or, alternatively, such automated tests could allow the operator to more intelligently decide whether a site should be visited or not.

One conventional automated test method, known as Radio Frequency Test Loop (RFTL), provides a loop between the transmitter and receiver paths of a base station. In a test mode, RF switches, connected to suitable attenuators, couple the transmitter of the base station to its receiver to test base-station receiver and transmitter paths. The RFTL, however, provides for the testing of some but not all elements within the system. For example, the RFTL method does not include base station antenna and feeder in the test loop. As a result, if an external object, which is positioned near the base station, impedes propagation of RF waves to and from the base station, or if the antenna has been damaged, the RFTL method is unable to accurately detect reception quality.

In another conventional approach, disclosed in Patent number WO 97/33446 titled "Remote Test of a Wireless Subscriber Connection," specific tests of an RF link and the test results are reported remotely from the mobile stations. Under this approach, a fixed number of test functions are pre-stored in the mobile station, for testing a particular link. In response to a test message, which is received via a radio path, the mobile station starts a specified test function and transmits the test results over the radio link. Sometimes, however, it is necessary to gather measurements at a particular geographical location in the network where testing is required. Furthermore, depending on operating conditions, a particular test measurement, not specified in the pre-stored test functions, may be necessary for the purpose of improving overall network performance and network configuration.

Therefore, the above described conventional methods do not offer the ability to automatically gather performance data relating to operational conditions of the mobile stations within one or more desired test locations. In particular, existing systems do not allow for configuring a mobile station for testing or evaluating an operational parameter not described or defined when the network was configured. Moreover, operational measurements performed by the mobile stations are limited to those specified by the operational software, for example, received signal strength (RSS) measurements. To gather specific operational data for a particular requirement, the operator must typically send out technicians into the field to take measurements using special test mobile stations or other equipment, which is an expensive and time-consuming activity.

Consequently, there exists a need to dynamically configure a mobile station to perform a specified test at one or more designated test locations, preferably using existing network elements, without manual intervention in the field.

SUMMARY

The above stated need and other needs are addressed by a communication system that determines test locations for performing one or more specified tests. A radio network performance manager originates one or more executable mobile test software agents, to operate mobile stations within the system in a test mode. Preferably, the mobile test software agents represent addressable computer programs that can be transported across data networks for dynamically configuring the mobile stations to allow for collection of performance information. Based on location information within the communication system, such as those contained in location registers, a network controller identifies one or more mobile stations that are capable of executing mobile test software agents (MTSAs) at specified test locations. When executing the mobile test software agents, the MTSA-capable mobile stations switch their normal operating mode to a test mode. In this way, the radio network performance manager is provided with dynamically configured information that may be processed for improving system performance.

In the exemplary embodiment, once the MTSA-capable mobile stations are identified, a test message is transmitted from the network controller to determine the availability of MTSA-capable mobile stations for performing the tests. For example, the availability of the mobile stations may be determined based on a subscriber's desire to participate in the test. Once available MTSA-capable mobile stations are identified, the MTSA is downloaded to the MSs and the tests are executed based on an execute message transmitted from the radio network performance manager.

According to some of the more detailed features of the present invention, in the test mode, the mobile stations may be configured to take specified measurements themselves or they may be configured to operate in a manner that measurements may be taken by one or more external resources. The measurements and the manner of operation may be dynamically configured by the mobile test software agent passing parameters relating to specified tests to the mobile stations. In this way, a mobile station may be configured to operate in the test mode under the control of the mobile test software agent, which, in an exemplary embodiment, is executed at the mobile station by a mobile resident application software.

DETAILED DESCRIPTION

Figure 1:
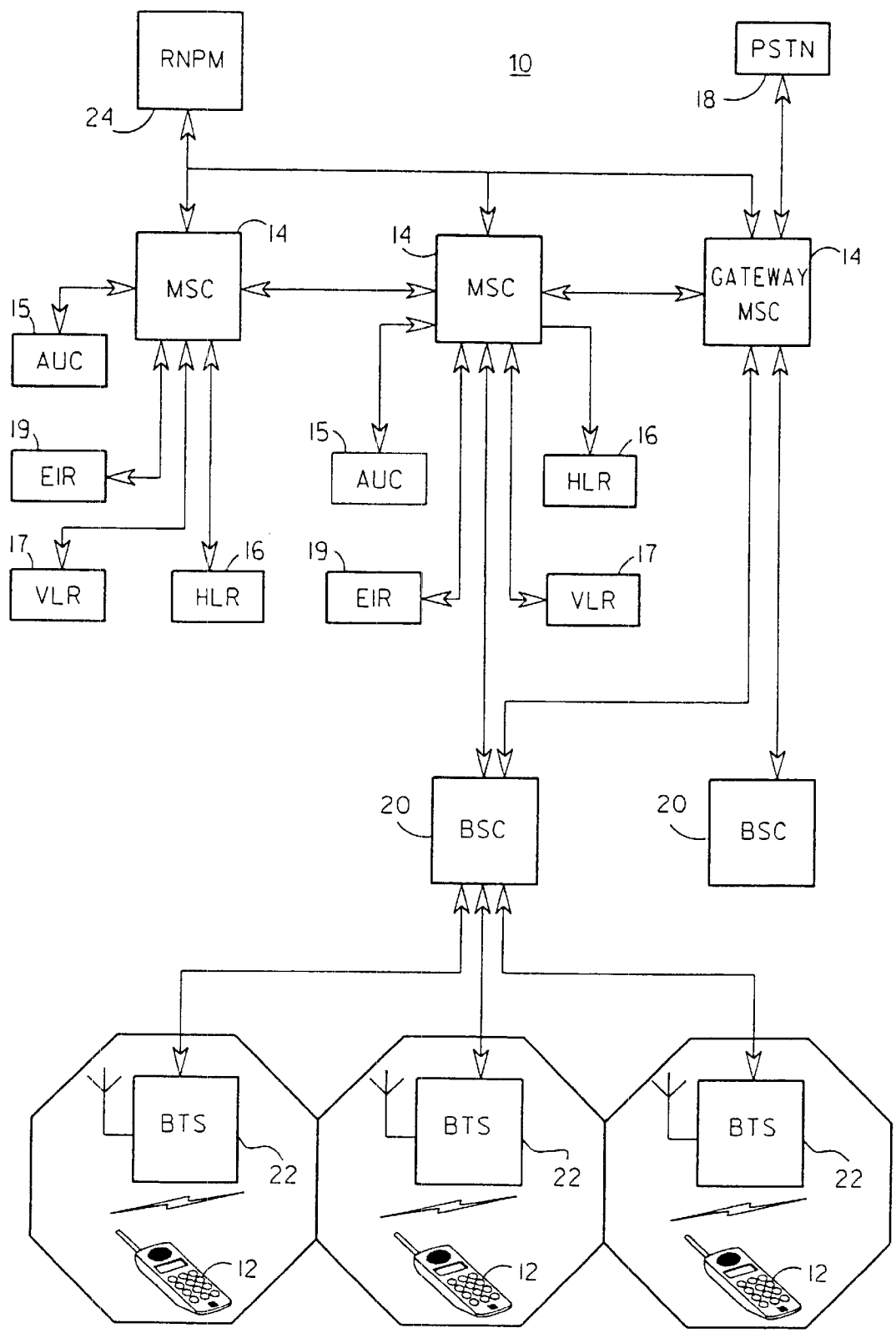
FIG. 1 is a block diagram of a communication system that advantageously incorporates the present invention.

Referring to FIG. 1, a block diagram of a communication system 10 that advantageously incorporates the present invention is shown. In an exemplary embodiment, it is assumed that the communication system 10 is a GSM communication system, that provides wireless communication capability for a plurality of mobile stations 12. The mode of operation of GSM communication systems is described in European Telecommunication Standard Institute (ETSI) documents ETS 300 573, ETS 300 574 and ETS 300 578. Therefore, the operation system 10 is described to the extent necessary for understanding of the present invention. Although the present invention is described as embodied in a GSM system, those skilled in the art would appreciate that the present invention could be used in a wide variety of other communication systems, such as those based on PDC, AMPS, or D-AMPS standards (IS-136) and enhancements thereof. The present invention may also be used in CDMA or a hybrid of CDMA and TDMA communication systems.

The communication system 10 covers a geographical area that is subdivided into communication cells, which together provide communication coverage to a service area, for example, an entire city. Preferably, the communication cells are patterned according to a cell pattern that allows some of the spaced apart cells to use the same uplink and downlink RF channels commonly known as frequency reuse. In communication system 10, an RF channel (uplink or downlink) is divided into repetitive time frames during which information in the form of data bursts are communicated. Speech or data is transmitted on digital channels designated as traffic channels (TCH). All signaling functions pertaining to call management in the system, including call setup, hand over, and call termination are handled via information transmitted over control channels or the traffic channels.

Using an allocated set of uplink and downlink RF channels, a number of mobile stations 12 operating within the system 10 participate in calls using allocated time slots that form the logical communication channels. As is well known, in the GSM systems, a Subscriber Information Module (SIM) card (not shown) is inserted into each mobile station 12 for providing subscriber identification, billing information and other information concerning the operation of the mobile station. Each GSM subscriber is identified by a SIM-based International Mobile Subscription Identity (IMSI) belonging to a specific SIM card. The IMSI, which corresponds to Mobile Identification Number (MIN) in AMPS systems, is also referred to as the SIM-ID. Upon a subscriber application, the system operator issues a SIM-ID number and a SIM card that when inserted in the GSM mobile terminal, enables the subscriber to use the services provided by the operator. In this way, the same GSM mobile station can be used with any inserted SIM card.

The system 10 is designed as a hierarchical network with multiple levels for managing calls and transmission of messages. At a higher hierarchical level, a group of Mobile Service Switching Centers (MSCs) 14 are responsible for the routing of calls from an originator to a destination. In particular, they are responsible for setup, control and termination of calls and broadcasting of messages. Each one of the MSCs 14 are associated with a corresponding home location register (HLR) 16 and a visitor location register (VLR) 17. The HLR 16 store information relating to mobile stations belonging to a home MSC, and the VLR 17 store information about visiting mobile stations. Generally, the MSCs 14 are connected to a public switching telephone network 18 (PSTN), to give connectivity between fixed landline subscribers and mobile subscribers.

At a lower hierarchical level, each one of the MSCs 14 are connected to a group of base station controllers (BSCs) 20. The primary function of a BSC 20 is radio resource management. It should be noted that some systems, for example, D-AMPS systems, combine the functions of the MSC 14 and BSC 20 to function as a network controller. Therefore, this specification refers to the combination as network controller (MSC/BSC). At a still lower hierarchical level, each one of the BSCs 20 control a group of base transceiver stations (BTSs) 22, which primarily provides network air interface, through RF links, for the transmission and reception of data bursts within a designated cell.

Operationally, when a mobile station 12 is operating in the system, its data is retrieved from a corresponding HLR 16 and stored in the VLR 17 of the MSC 14, which serves the cells in the area where the mobile station 12 is located. The home MSC 14 notes the identity of the current VLR 17 and the fact that the mobile station 12 is active. Incoming calls for a called mobile station 12 interrogate the HLR 16, based on knowledge of the mobile station's IMSI (or MIN in AMPS systems). If the called mobile station 12 is active, the call is routed to the appropriate MSC 14 for paging the mobile station 12. Periodically, the mobile stations 12 re-registers themselves to let the network controller (MSC/BSC) know that they are still active and allow the network to determine where within its cells they are located. In a well known manner, an authentication center (AUC) block 15 performs an authentication process by comparing a terminal generated AUTHR with a network generated AUTHR to validate a call. As is conventional, an equipment identity register (EIR) block 19 stores all information and features and functional capabilities of the mobile stations 12. The EIR block 19 is also used to determine whether a mobile station is black listed, for example, when it is stolen.

According to the present invention, communication system 10 supports Mobile Test Software Agents (MTSAs) that are software modules, executable at the mobile stations 12, for placing them in a test mode. In the test mode, each mobile station 12 is configured, according to parameters defined by a MTSA, for example, either to take a series of specified measurements, or to operate in a manner that measurements may be taken by another resource, such as a BTS 22. As a result, the mobile stations 12 are equipped with a software application that supports the execution of the MTSAs for operating in the test mode. Each MTSA represents an active, addressable computer program that can observe and initiate activities in its environment, can communicate with other agents and can be transported across data networks that are configured to take performance measurements.

According to one of the features of the invention, some of the mobile stations 12 in addition to having their normal operational capabilities, also incorporate the capability to execute MTSAs for operating in the test mode. Because not all mobile stations operating within the system may have the capability to execute MTSAs according to the present invention, in the exemplary embodiment, the EIR block 19 contains "MTSA-capable identifier" fields, identifying those mobile stations with the capability to execute MTSAs. As stated above, the communication system 10 can identify the location of the mobile stations 12 as they travel. As such, the system 10 is equipped to query the EIR block 19 for "MTSA-capable identifier" fields and the HLR 16 or VLR 17 for "location identifier" fields to identify MTSA-capable mobile stations 12, that operate within a desired test cell or geographical location. If a MTSA-capable mobile station 12 is not available in a desired test location, then a required test measurement is postponed until such time that an MTSA-capable mobile station becomes available at the desired test location.

Under another aspect of the invention, a separate list of location identifier fields is created and maintained of available MTSA-capable mobile stations in different locations. The so created list is accessible and updatable by a Radio Network Performance Manager (RNPM), and stored in connection with the RNPM or in a separate storage unit. In this way, the EIR, HLR and VLR do not have to be scanned each time a test is to be performed.

Under the present invention, the MTSAs are downloaded into a remotely located mobile station 12 at desired test location via an RF link. The network controller (MSC/BSC) can choose to download the MTSA immediately or at some time in the future, for example, when a target mobile station 12 is not participating in a call. The availability of an MTSA-capable mobile station is determined by transmitting a "test message" from the network controller (MSC/BSC) to one or more MTSA-capable mobile stations. In response to the transmitted test message, the MTSA-capable mobile stations may indicate their availability status, for example, based on the subscriber's wish to participate in tests. Under one arrangement of the invention, the network controller (MSC/BSC) may be set up to give subscribers an option to decide whether their mobile stations 12 could be operated in a test mode or not. For example, a network operator may offer an incentive in the form of a discount rate to the subscribers, for enticing them to participate in system performance enhancement tests. Under this arrangement, each subscriber's choice may be reflected by "choice identifier" fields in the EIR block 19 or a separately accessible list, that can be combined with the list of location identifiers.

Moreover, the type and extent of a measurement can be based on the number of available MTSA-capable mobile stations in an area of interest. For example, if only a small number of MTSA-capable mobile stations are positioned in the area of interest, the operator or the RNPM may choose to perform a long series of measurements. However, upon availability of a large number of MTSA-capable mobile stations, short measurements may be performed by each mobile station.

In the exemplary embodiment, the performance improvement functionality is provided by the RNPM 24, which provides the operator with performance information to help configure the system, or to itself automatically configure elements of the system based on gathered performance data. In order to improve system performance, the operator or the RNPM 24 determines a required measurement involving a test activity at one or more test locations within the coverage area. The test activity may, for example, be a test that requires taking uplink or downlink measurements. The RNPM 24 acts as a server for originating MTSAs and controls the downloading of the selected MTSA to the mobile stations 12. The RNPM 24 originates the MTSAs for required test measurements, and transmits the MTSAs to the mobile stations identified by the network controller (MSC/BSC), for example, via SMS messages on a digital channel, which is a well known industry standard.

The downloading of the MTSAs may be performed automatically or the subscriber may be instructed to depress a specific key or keys to initiate the downloading process. In an exemplary embodiment, the network controller (MSC/BSC) may use a well-known Short Message Services (SMS) to transmit a SMS test message to either a single mobile station or to a plurality of them, before the MTSA is downloaded. Each available MTSA-capable mobile station 12 responds to the test message by transmitting an acknowledgment to the RNPM 24 and waits for data transfer. The RNPM 24 receives the acknowledgement and the IMSIs of one or more MTSA-capable mobile stations 12 that are identified to be at desired test locations within the coverage area. The RNPM 14, then, routes the MTSA to be downloaded to the mobile station 12. On response, from the mobile station 12 to the RNPM 14, of a completed downloading, the RNPM 24 transmits an execute message initiating the execution of the downloaded MTSA in the mobile station 12. Alternatively the execution of the MTSA is activated at a later time.

Figure 2A:
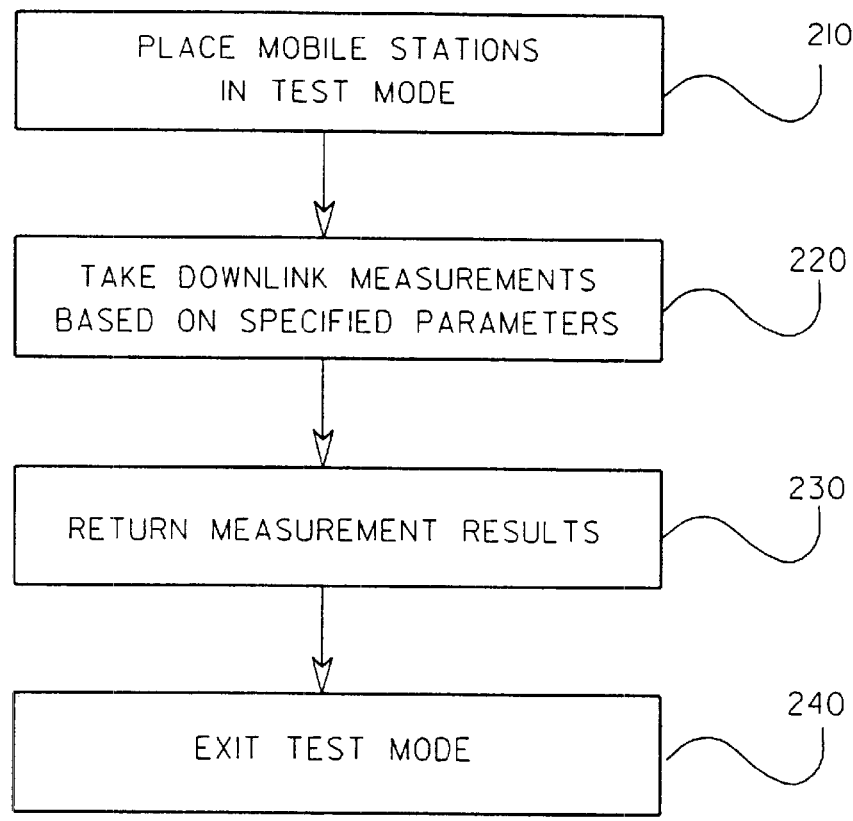
FIGS. 2(a) 2(b) are flow charts of executable mobile test software agents used in the communication system of FIG. 1.

The RNPM 24 stores a number of MTSAs that comprise executable software by the mobile stations 12 for operating in a particular test mode. Under the present invention, various classes of MTSAs may be defined and configured for corresponding required test measurements. Referring to FIGS. 2(*a*) and 2(*b*), flow charts of the operational steps taken by two exemplary MTSAs are shown. As is well known, these operational steps could be implemented using code written in a suitable programming language that may be executed at each MTSA-capable mobile station 12, preferably using a mobile station resident application program, for placing the mobile station in a particular test mode.

In FIG. 2(*a*), the flow chart of the first exemplary MTSA configures the mobile station to take specified downlink measurements, such as received signal strength or bit error, on specified RF links, blocks 210 and 220. The specified measurements and the frequencies of the RF link are passed down as software parameters for configuring the mobile station 12 to take the specified measurements. As such, the RNPM 24 can dynamically configure the mobile station 12 by passing down suitable parameters. Thus, the measurement capability of the mobile station 12 is not limited to those defined by the normal operational software. Rather, the mobile station 12 can be configured to take measurements that are beyond those specified by the operating software. In its simplest form, for example, the mobile station 12 may be configured to scan a specified frequency spectrum to make received signal quality measurements. Once, the measurements are taken, the mobile station 12 transmits the measurement results to the RNPM 24 and exits the test mode, blocks 230 and 240.

Figure 2B:
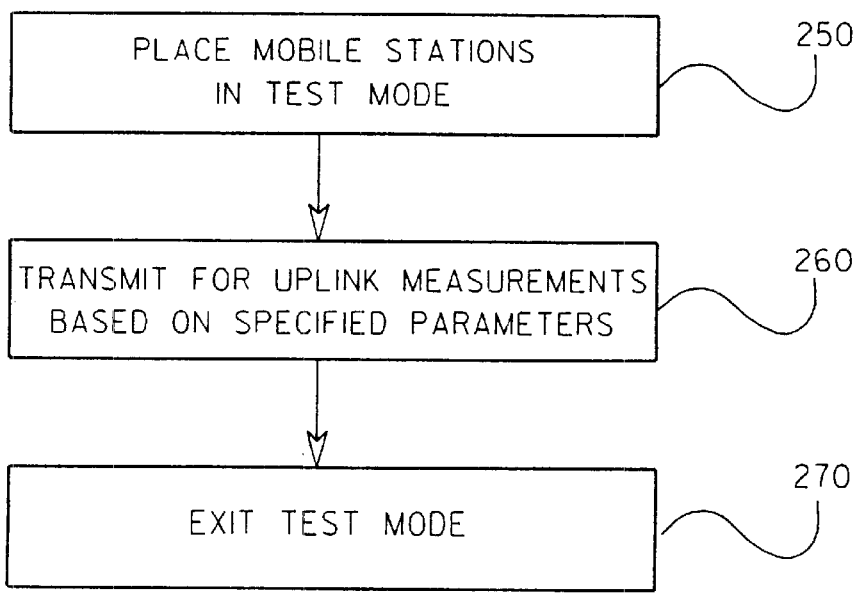

According to FIG. 2(b), the second executable MTSA configures the mobile station 12 to operate in a manner that uplink measurement may be made by another resource, blocks 250 and 260. For example, the mobile station may be configured to transmit at specified uplink frequencies, based on parameters passed down by the executable MTSA, for taking measurements at one or more BTSs 22. It may be appreciated that by passing down suitable parameters via the MTSAs, the present invention allows the mobile station 12 to be dynamically configured to operate in a specified test mode. After operating in the specified test mode, the mobile station 12, under the control of the MTSA, exits the test mode, block 270.

Figure 3:
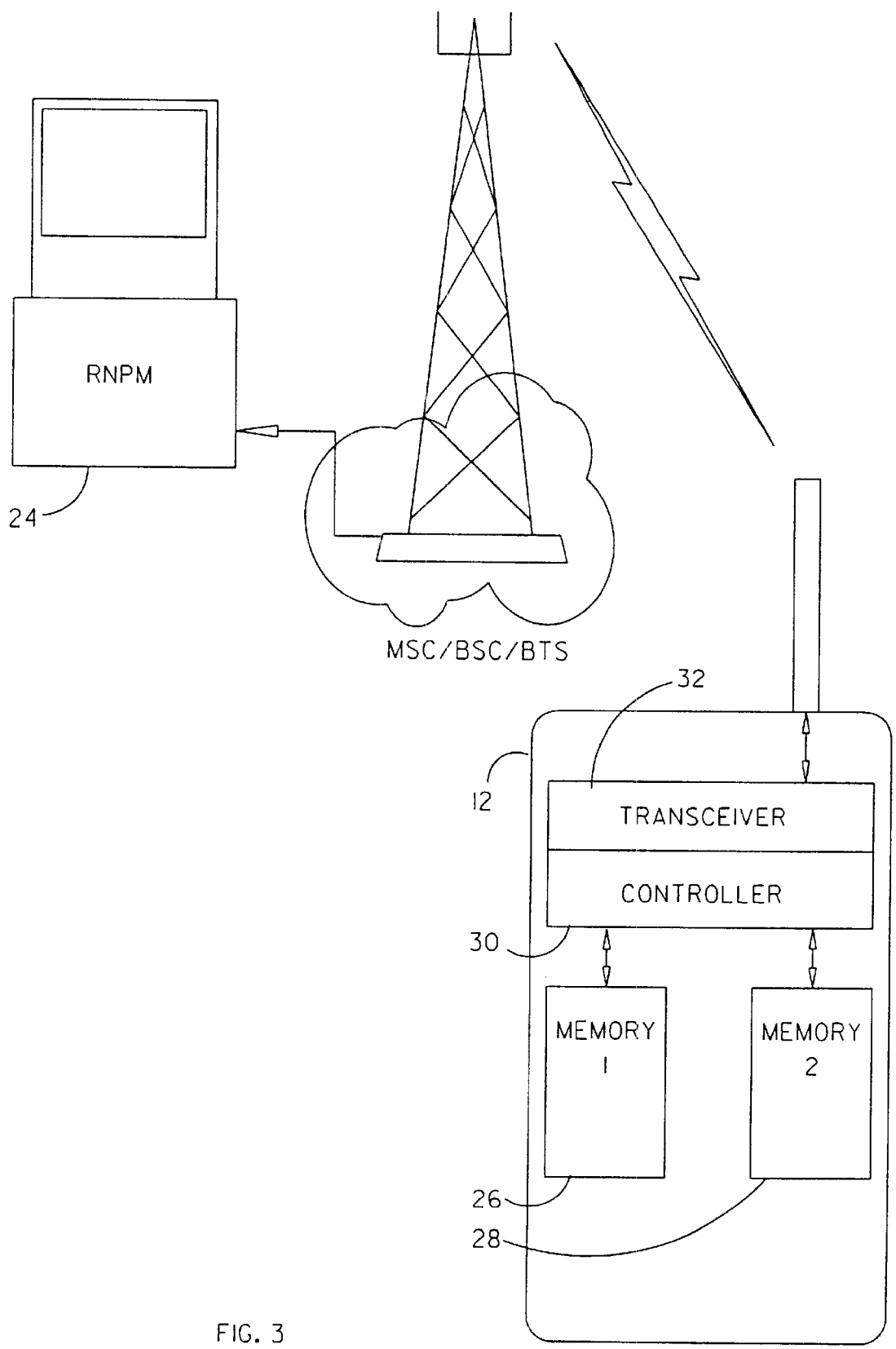
FIG. 3 is a diagram depicting downloading of a mobile test software agent to a mobile station.
Figure 4:
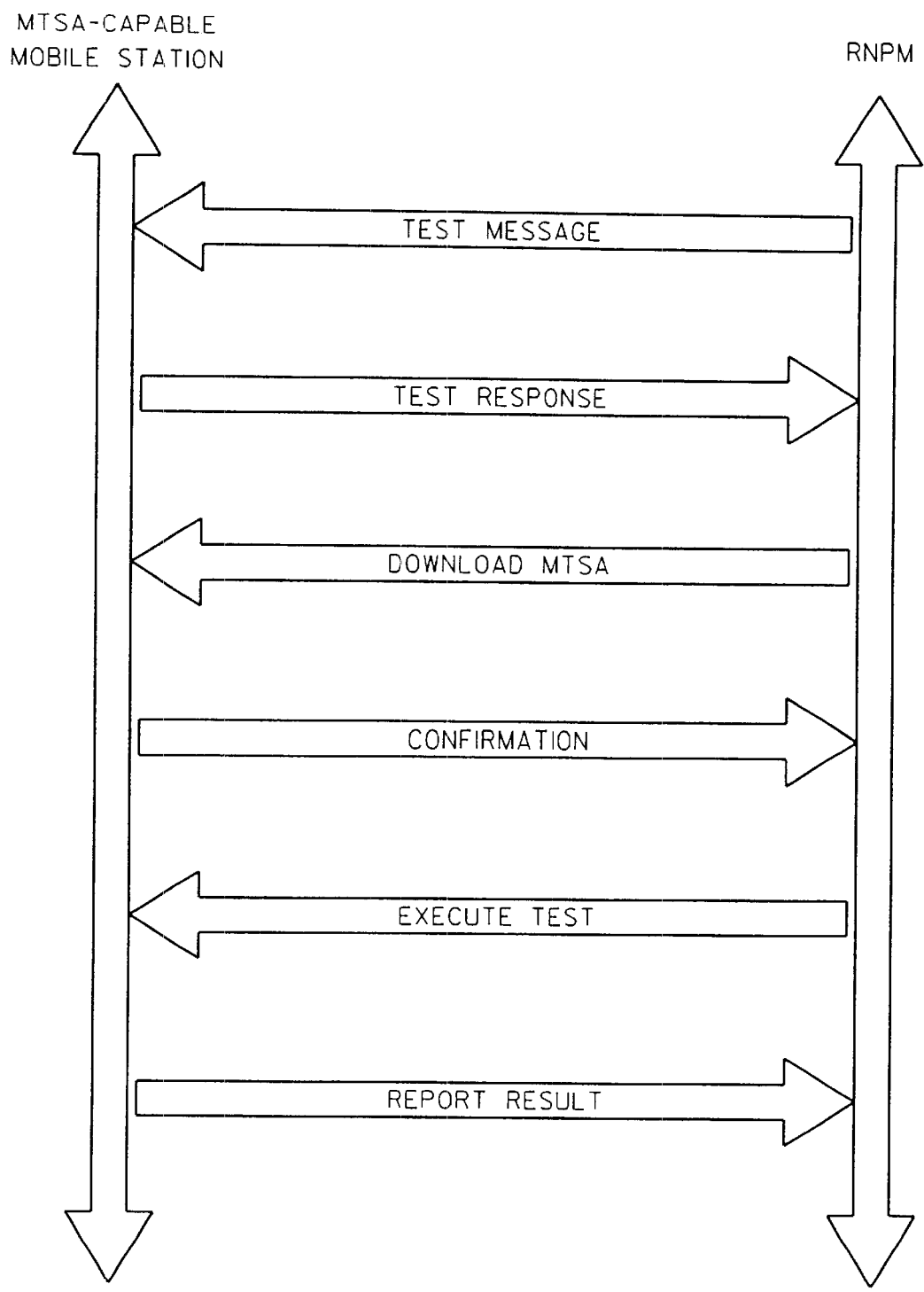
FIG. 4 is a flow diagram of a communication within the communication system of FIG. 1.

FIG. 3 is a diagram depicting remote downloading of the MTSAs into a mobile station 12. As shown, the RNPM 24 communicates with the network controller (MSC/BSC), which, as described above, provides wireless communication with the mobile stations through the BTSs 22. FIG. 4 is a diagram illustrating the communication between the MTSA-capable mobile stations and the RNPM. After identifying one or more available mobile stations for executing a MTSA at the determined test locations, the RNPM 24 order the Network Controller (MSC/BSC) to transmit a test message to the selected mobile stations. Based on the test response the RNPM 24 initiates the downloading process. In an exemplary embodiment, the mobile station 12 uses two FLASH memory sections 26 and 28 with a first memory section 26 storing an operational software and a second memory section 28 storing the downloaded MTSAs. A controller 30 communicates with the RNPM 24 via a transceiver 32 to load received MTSAs into the second memory section 28. The controller 30 designates one of the two memory sections as active and the other as inactive, with the active memory containing the software currently executed by the mobile station 12. The controller 30 can also toggle between the two memory sections 26 and 28, thereby designating the formerly active memory section as inactive, and conversely, designating the formerly inactive memory section as active. In this way, the mobile station 12 in addition to normal transceiver functionality for providing wireless communication, is further programmed to execute the received MTSA, for performing a remote test as required by the RNPM 24. Toggling between the memory sections 26 and 28 switches the operating mode of the mobile station 12 from the normal operating mode to the test mode and vice versa, thus allowing for switching operational modes as necessary or at instances specified by the downloaded MTSA.

The controller 30 calculates a checksum on the received MTSA and compares the calculated checksum against a known checksum received at the mobile station 12 from the RNPM 24. If the calculated checksum does not match the known checksum, the controller 30 requests a retransmission and does not toggle the designation of the memory sections 26 and 28, and the mobile station 12 continues to operate using the normal operating software. If, on the other hand, the checksum is successful, the controller 30 passes control from normal operating software to the downloaded MTSA. The mobile station 12 transmits a message to the RNPM 24 acknowledging the successful download. The execution of the MTSA, i.e. placing the mobile station in test mode, is initiated by an "execute test" message passed from the RNPM 24 to the mobile station 12. As a result of the execution of the MTSAs at the mobile stations 12, necessary test data is gathered and transmitted back to the RNPM 24 in a "report result message," which can then process the data for optimizing system performance.

Figure 5:
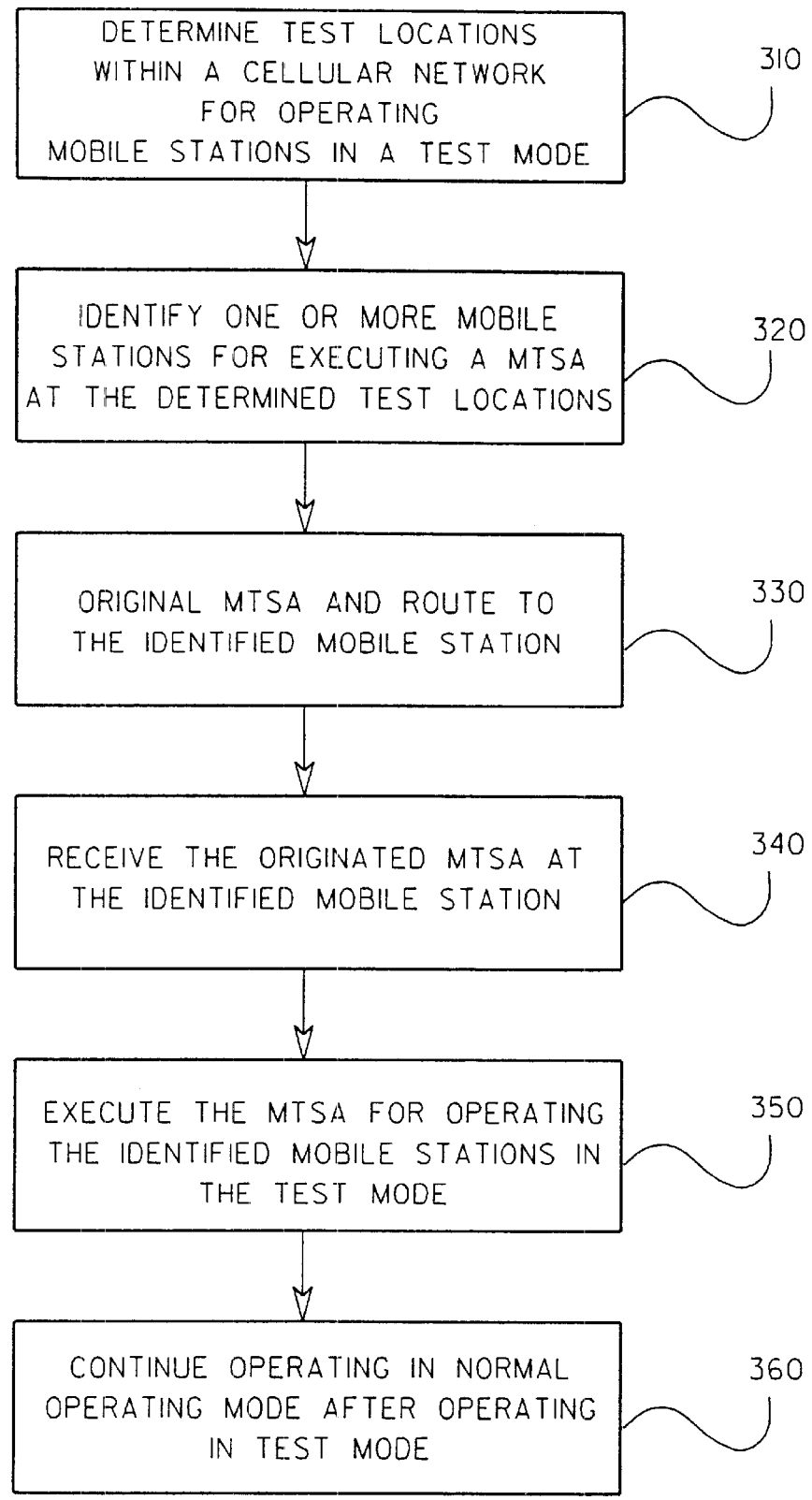
FIG. 5 is a flow chart of a method according to the present invention.

Referring to FIG. 5, a block diagram of steps of a method for operating the communication system 10 according to the present invention is shown. At first, a determination is made as to the locations for performing one or more tests within the system 10, block 310. Then, one or more mobile stations 12 are identified (block 320) for executing a selected MTSA at the determined test locations to place the mobile stations in a test mode, for example, for gathering test measurements related to the performance tests or for operating the mobile station so that test measurements may be made by another resource. As explained above, the mobile stations 12 are identified based on their location information in the HLR 16, VLR 17 and their test and equipment capability in the EIR block 19. Once identified, the RNPM 24 originates one or more selected MTSAs for being downloaded into the identified mobile stations 12, block 330. The mobile stations 12 receive and execute the originated MTSAs, for operating in the test mode, blocks 340 and 350. If a mobile station 12 acts as a measurement resource, the test measurements are returned to the RNPM 24. Otherwise, the measurement results are communicated to the RNPM by a measurement resource used during the test. Once the MTSA completes being executed, the mobile station continues operating in normal operating mode, block 360.

From the foregoing description, it will be appreciated that the present invention provides for improving network performance by executing specific performance measurements at particular locations by identified mobile stations capable of performing dynamically configured tests, without the need for dedicated test equipment.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. A communication system, comprising:
   a radio network performance manager that originates one or more executable mobile test software agents;
   mobile stations that can execute the one or more mobile test software agents, for switching their normal operating mode to a test mode;
   a network controller that based on location information identifies one or more mobile stations that can execute mobile test software agents at specified test locations and downloads the one or more executable mobile test software agents to the one or more identified mobile stations.

2. The communication system of claim 1, wherein the mobile test software agent passes a parameter relating to a specified test to the mobile station.

3. The communication system of claim 2, wherein the mobile station is configured to operate in the test mode using the parameter passed by the mobile test software agent.

4. The communication system of claim 1, wherein the mobile test software agent is executed at the mobile station by a mobile resident application software.

5. The communication system of claim 1, wherein in the test mode, the mobile station takes specified measurements.

6. The communication system of claim 1, wherein in the test mode, the mobile station operates in a manner that measurements may be taken by an external resource.

7. The communication system of claim 1, wherein the network controller identifies mobile stations for executing mobile test software agents at the test locations based on information stored in a location register.

8. The communication system of claim 1, wherein capability identifier fields in a register identify those mobile stations with the capability to execute the mobile test software agents.

9. The communication system of claim 1, wherein choice identifier fields in a register indicate whether corresponding mobile stations that execute mobile test software agents should be placed in test mode or not.

10. The communication system of claim 1, wherein the mobile test software agent represents an addressable computer program that can be transported across data networks.

11. The communication system of claim 1, wherein said mobile stations may choose not to download the mobile test software agents.

12. The communication system of claim 1, wherein the downloading of the one or more executable mobile test software agents is postponed until the one or more mobile stations that execute the mobile test software agents are available at the specified test locations.

13. A method for operating a communication system, comprising the steps of:

determining test locations for performing one or more specified tests within the communication system;

originating executable mobile test software agents that configure mobile stations within the communication system to operate in a test mode, for collecting test system performance information;

identifying one or more mobile stations that can execute the one or more mobile test software agents at the test locations;

downloading the originated executable mobile test software agents to the identified one or more mobile stations;

executing the mobile test software agent at the identified one or more mobile stations; and operating the mobile station in a normal operating mode after the test mode.

14. The method of claim 13, wherein the mobile test software agent passes a parameter relating to the specified test to a mobile station.

15. The method of claim 14, wherein the mobile station is configured to operate in the test mode using the parameter passed by the mobile test software agent.

16. The method of claim 13, wherein the mobile test software agent is executed at the mobile station by a mobile resident application software.

17. The method of claim 13, wherein in the test mode, the mobile station takes specified measurements.

18. The method of claim 13, wherein in the test mode, the mobile station operates in a manner that measurements may be taken by an external resource.

19. The method of claim 13, the mobile stations that execute mobile test software agents at a test location are identified based on information stored in a location register.

20. The method of claim 13, wherein mobile test software agent represents an addressable computer program that can be transported across data networks.

21. The method of claim 13, wherein capability identifier fields in a register identify those mobile stations with the capability to execute the mobile test software agents.

22. The method of claim 13, wherein choice identifier fields in a register indicate whether corresponding mobile stations that execute mobile test software agents should be placed in test mode or not.

23. The system of method of communication system of claim 13, wherein the downloading of the one or more executable mobile test software agents is postponed until the one or more mobile stations that execute the mobile test software agents are available at the specified test locations.

24. The method of communication system of claim 13, wherein said mobile stations may choose not to download the mobile test software agents.

25. A method for operating a communication system, comprising the steps of:

listing mobile stations capable of executing executable mobile test software agents that configure the mobile stations to operate in a test mode, for collecting test system performance information;

identifying one or more mobile stations that can execute the one or more mobile test software agents at selected test locations based on capability and location identifiers associated with each one of the listed mobile stations; and downloading the originated executable mobile test software agents to the identified one or more mobile stations based on choice identifiers associated with each one of the listed mobile stations; and updating the identifiers associated with the listed mobile stations as necessary.

* * * * *